(12) United States Patent
Ben Rached et al.

(10) Patent No.: US 12,052,593 B2
(45) Date of Patent: Jul. 30, 2024

(54) RESOURCE SCHEDULING IN COMMUNICATION SYSTEMS USING BEAM-SPECIFIC POWER CONTROL

(71) Applicant: Nokia Solutions and Networks Oy, Espoo (FI)

(72) Inventors: Nidham Ben Rached, Paris (FR); Veronique Capdevielle, Nozay (FR); Philippe Picquet, Longpont-sur-Orge (FR); Afef Feki, Sceaux (FR)

(73) Assignee: Nokia Solutions and Networks Oy, Espoo (FI)

( * ) Notice: Subject to any disclaimer, the term of this patent is extended or adjusted under 35 U.S.C. 154(b) by 420 days.

(21) Appl. No.: 17/290,001

(22) PCT Filed: Oct. 30, 2018

(86) PCT No.: PCT/EP2018/079663
§ 371 (c)(1),
(2) Date: Apr. 29, 2021

(87) PCT Pub. No.: WO2020/088742
PCT Pub. Date: May 7, 2020

(65) Prior Publication Data
US 2022/0007218 A1    Jan. 6, 2022

(51) Int. Cl.
*H04W 24/08*    (2009.01)
*H04B 7/0413*    (2017.01)
*H04W 72/044*    (2023.01)

(52) U.S. Cl.
CPC .......... *H04W 24/08* (2013.01); *H04B 7/0413* (2013.01); *H04W 72/044* (2013.01)

(58) Field of Classification Search
CPC ... H04W 24/08; H04W 72/044; H04W 24/02; H04W 24/04; H04W 36/00835;
(Continued)

(56) References Cited

U.S. PATENT DOCUMENTS

| 8,644,288 B2 | 2/2014 | Wang et al. |
| 2013/0115999 A1 | 5/2013 | Sirotkin et al. |

(Continued)

FOREIGN PATENT DOCUMENTS

| CN | 107306162 A | 10/2017 |
| WO | 2017/000193 A1 | 1/2017 |

(Continued)

OTHER PUBLICATIONS

U.S. Appl. No. 62/581,538 (Year: 2017).*

(Continued)

*Primary Examiner* — Rushil P. Sampat
(74) *Attorney, Agent, or Firm* — Harness, Dickey & Pierce, P.L.C.

(57) ABSTRACT

Apparatuses, methods and computer programs are described including, receiving user equipment downlink power measurements from one or more base stations of a communication system, wherein the one or more base stations are configured to provide a plurality of user equipment downlink power measurements for user equipment in communication with a respective base station of the one or more base stations; determining inter-beam interference for multiple directive beams of the or each base station based on the user equipment download power measurements; and assigning one or more beams to one or more clusters such that, for all beams within a cluster, inter-beam interference is below a threshold, wherein beams within a cluster share time and/or frequency resources.

15 Claims, 10 Drawing Sheets

(58) Field of Classification Search
CPC ......... H04W 36/0085; H04W 36/0094; H04W 36/06; H04B 7/0413; H04B 7/0408; H04B 7/0695; H04B 17/309; H04B 7/088
See application file for complete search history.

(56) References Cited

U.S. PATENT DOCUMENTS

| | | | |
|---|---|---|---|
| 2017/0207843 | A1 | 7/2017 | Jung et al. |
| 2017/0373737 | A1 | 12/2017 | Liang et al. |
| 2018/0006703 | A1 | 1/2018 | Kim |
| 2018/0020363 | A1 | 1/2018 | Faxér et al. |
| 2019/0082332 | A1* | 3/2019 | Raghavan ............ H04B 7/0695 |
| 2019/0141640 | A1* | 5/2019 | Abedini ............ H04W 52/146 |
| 2020/0100119 | A1* | 3/2020 | Byun .................. H04W 76/14 |
| 2020/0314828 | A1* | 10/2020 | Schubert ................ H04B 7/063 |

FOREIGN PATENT DOCUMENTS

| | | |
|---|---|---|
| WO | 2018/017977 A1 | 1/2018 |
| WO | 2018/063079 A1 | 4/2018 |

OTHER PUBLICATIONS

Office action received for corresponding European Patent Application No. 18803879.8, dated Feb. 28, 2023, 4 pages.

Office action received for corresponding Chinese Patent Application No. 201880099191.8, dated Jun. 8, 2023, 8 pages of office action and no page of translation available.

Da Silva et al., "Distributed Spectral Efficiency Maximization in Full-Duplex Cellular Networks", IEEE International Conference on Communications Workshops (ICC), May 23-27, 2016, pp. 1-7.

"New SID Proposal: Study on Integrated Access and Backhaul for NR", 3GPP TSG RAN Meeting #75, RP-17148, Agenda : 9.1, AT&T, Mar. 6-9, 2017, 5 pages.

Shang et al., "Delta Metric Scheduling for LTE-Advanced Uplink Multi-User MIMO Systems", IEEE 75th Vehicular Technology Conference (VTC Spring), May 6-9, 2012, 5 pages.

Lee et al., "Low Complexity User Pairing Algorithm for in-band Full-duplex Networks with Power Control", 23rd Asia-Pacific Conference on Communications (APCC), Dec. 11-13, 2017, 5 pages.

Luxburg, "A Tutorial on Spectral Clustering", Statistics and Computing, vol. 17, No. 4, 2007, pp. 1-32.

Saur et al., "Grid-of-beams (GoB) Based Downlink Multi-user MIMO", IEEE 802.16 Broadband Wireless Access Working Group, May 5, 2008, pp. 1-4.

International Search Report and Written Opinion received for corresponding Patent Cooperation Treaty Application No. PCT/EP2018/079663, dated Jul. 4, 2019, 13 pages.

Office Action issued Nov. 24, 2023 in Chinese Application No. Chinese Patent Application No. 201880099191.8.

Office Action issued Mar. 18, 2024 in Chinese Application No. Chinese Patent Application No. 201880099191.8.

\* cited by examiner

RESOURCE SCHEDULING IN COMMUNICATION SYSTEMS USING BEAM-SPECIFIC POWER CONTROL

RELATED APPLICATION

This application was originally filed as PCT Application No. PCT/EP2018/079663, filed on Oct. 30, 2018, of which is incorporated herein by reference in its entirety.

FIELD

The present specification relates to assigning resources in communication systems.

BACKGROUND

Resources in communication systems are limited. It is known to share such resources amongst multiple users. There remains a need for alternative arrangements for sharing such resources and controlling the allocation of such resources.

SUMMARY

In a first aspect, this specification describes an apparatus comprising: means for receiving (for example, at a beams cluster builder (BCB), such as a beams cluster builder of a radio access network controller) user equipment downlink power measurements from one or more base stations (e.g. a plurality of base stations) of a communication system, wherein the or each base station provides a plurality of user equipment downlink power measurements (such as per-beam downlink power measurements) for user equipment in communication with said base station; means for determining (e.g. at a beams cluster selection entity) inter-beam interference for multiple directive beams (e.g. of each transmitter and/or receiver) of the or each base station based on the user equipment downlink power measurements; and means for assigning (e.g. at the beams cluster selection entity referred to above) one or more beams to one or more clusters such that, for all beams within a cluster, inter-beam interference is below a threshold, wherein beams within a cluster share time and/or frequency resources.

Some embodiments include means for forwarding information relating to said one or more clusters to the one or more base stations for use in scheduling user equipment communications.

Some embodiments include means for sending a trigger to the one or more base stations, wherein the user equipment downlink power measurements are obtained by the or each base stations in response to the trigger.

The means for determining inter-beam interference and/or the means for assigning said one or more beams to said one or more clusters may be provided as part of a radio access network controller. Alternatively, the means for determining inter-beam interference and/or the means for assigning said one or more beams to said one or more clusters may be provided as part of one or more of the base stations.

The one or more beams may be assigned to one or more clusters using spectral clustering. Alternatively, or in addition, the one or more beams may be assigned to one or more clusters using hierarchical clustering. Many arrangements for assigning one or beams to one or more clusters are possible. Spectral or hierarchical clustering (e.g. hierarchical agglomerative clustering) are examples of methods that could be used by clusters builders. Other methods are also possible.

In some example embodiments, means for evaluating similarity between beams based on the user equipment downlink power measurements are provided, wherein said one or more beams may be assigned to said one or more clusters based on the similarity. The similarity may be inversely proportional to inter-beam interference, although many other definitions of similarity could be used. The similarity may, for example, be evaluated at least partially based on a distance between beams and/or from a statistical analysis of the user equipment downlink power measurements.

The user equipment downlink power measurements may comprise information of downlink power received from beams transmitted by at least two base stations.

The communication system may be a multi-user multiple-input-multiple-output (MIMO) communication system.

The said means may comprise: at least one processor; and at least one memory including computer program code, the at least one memory and the computer program code configured, with the at least one processor, to cause the performance of the apparatus.

In a second aspect, this specification describes a method comprising: receiving (e.g. at a beams cluster builder) user equipment downlink power measurements from a one or more base stations of a communication system, wherein the or each base station provides a plurality of user equipment downlink power measurements (such as per-beam downlink power measurements) for user equipment in communication with said base station; determining (e.g. at a beams cluster selection entity) inter-beam interference for multiple directive beams of the or each base station based on the user equipment download power measurements; and assigning (e.g. at the beams cluster selection entity) one or more beams to one or more clusters such that, for all beams within a cluster, inter-beam interference is below a threshold, wherein beams within a cluster share time and/or frequency resources.

The method may comprise forwarding information relating to said one or more clusters to the one or more base stations for use in scheduling user equipment communications.

The method may comprise sending a trigger to the one or more base stations, wherein the user equipment downlink power measurements are obtained by the or each base stations in response to the trigger.

The one or more beams may, for example, be assigned to one or more clusters using spectral clustering and/or hierarchical clustering.

Some example methods may include evaluating similarity between beams based on the user equipment downlink power measurements, wherein said one or more beams are assigned to said one or more cluster based on the similarity.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: receive user equipment downlink power measurements from one or more base stations of a communication system, wherein the or each base station provides a plurality of user equipment downlink power measurements for user equipment in communication with said base station; determine inter-beam interference for multiple directive beams of the or each base station based on the user equipment download power measurements; and assign one or more beams to one or more clusters such that, for all beams within a cluster, inter-beam interference is below a threshold, wherein beams within a cluster share time and/or frequency resources.

In a sixth aspect, this specification describes a computer-readable medium (such as a non-transitory computer readable medium) comprising program instructions stored thereon for performing at least the following: receiving user equipment downlink power measurements from one or more base stations of a communication system, wherein the or each base station provides a plurality of user equipment downlink power measurements for user equipment in communication with said base station; determining inter-beam interference for multiple directive beams of the or each base station based on the user equipment download power measurements; and assigning one or more beams to one or more clusters such that, for all beams within a cluster, inter-beam interference is below a threshold, wherein beams within a cluster share time and/or frequency resources.

BRIEF DESCRIPTION OF THE DRAWINGS

Example embodiments will now be described, by way of non-limiting examples, with reference to the following schematic drawings, in which.

DETAILED DESCRIPTION

Figure 1:
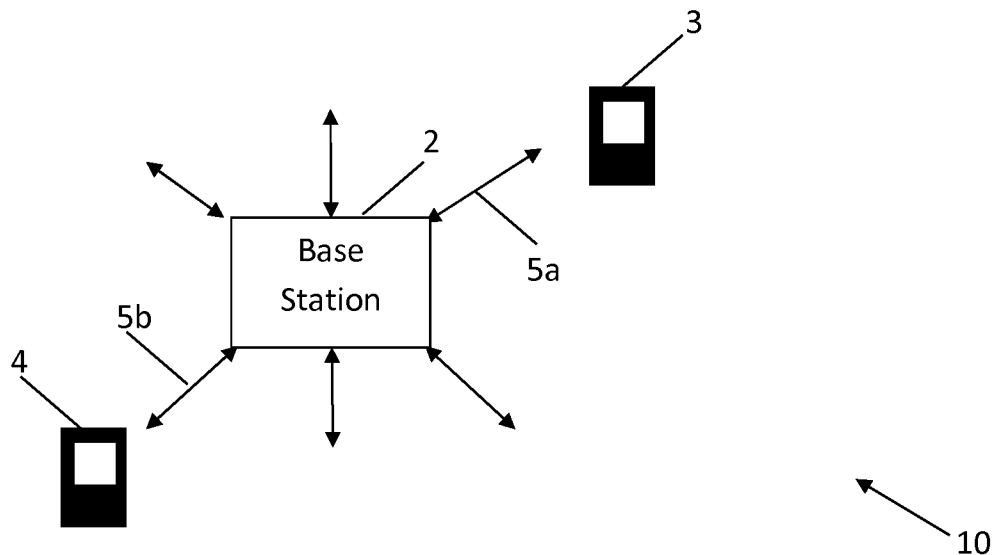
FIG. 1 is a block diagram of a system in accordance with an example embodiment.

FIG. 1 is a block diagram of a system, indicated generally by the reference numeral 10, comprising a base station 2, a first user equipment 3 and a second user equipment 4.

The base station 2 includes a plurality of channels for communication with one or more other base stations, and/or one or more user equipments. For example, the base station 2 may communicate with the first user equipment 3 using a first channel 5a and the base station 2 may communicate with the second user equipment 4 using a second channel 5b.

Each channel is directional and may have a fixed direction (such that the base station 2 may implement a so-called pre-set grid of beams (GoB)). The directionality may reduce power consumption and increase efficiency in such systems, which systems are sometimes referred to as space-division multiple access (SDMA) systems.

The system may be implemented using a Multi-Users Multiple Input Multiple Output (MU-MIMO) scheduler. The system comprises an extensible radio access network (xRAN), and a plurality of base stations, similar to base station 2 may connect to the xRAN.

Figure 2:
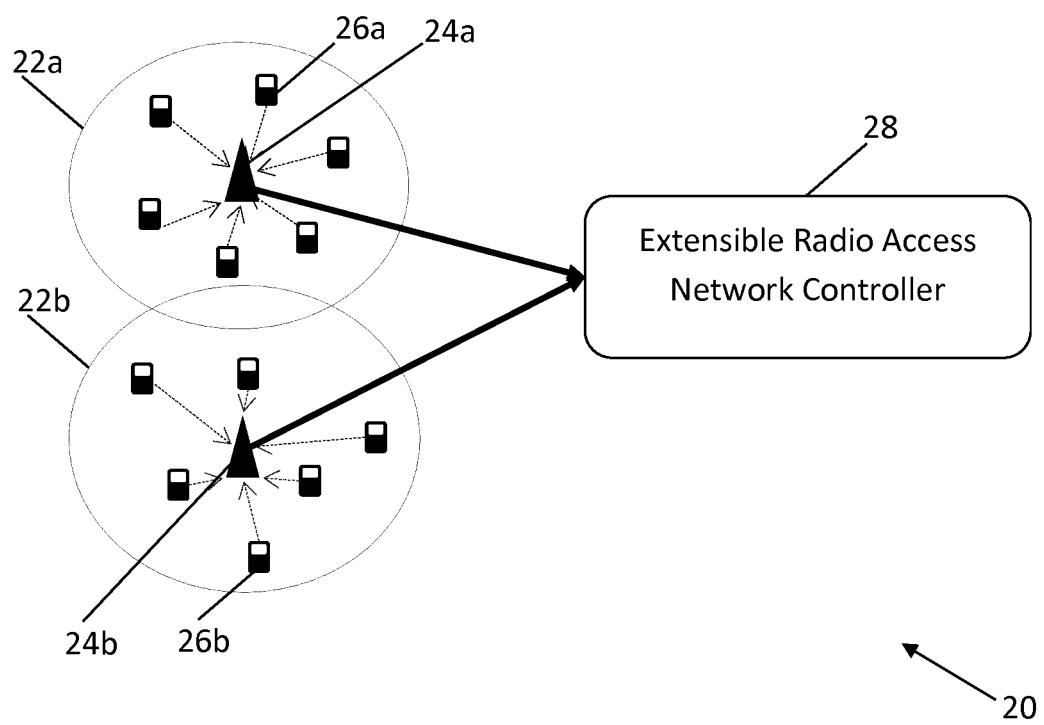
FIG. 2 is a block diagram of a system in accordance with an example embodiment.

FIG. 2 is a block diagram of a system, indicated generally by the reference numeral 20, in accordance with an example embodiment. System 20 comprises a first base station 24a, a first plurality of user equipment 26a in communication with the first base station 24a, a second base station 24b, a second plurality of user equipment 26b in communication with the second base station 26a, and an extensible radio access network controller (xRAN controller) 28. The first base station has a coverage area illustrated by coverage area 22a, and the second base station 26b has a coverage area illustrated by coverage area 22b. The xRAN controller 28 may be comprised in a radio access network. A plurality of base stations, similar to the first and second base stations 24a and 24b may connect to the radio access network. The xRAN controller 28 may be used for controlling the channels used by the plurality of base stations and the plurality of user interfaces. The dotted arrows represent information sent from the plurality of user equipment to a corresponding base station. For example, one or more of the first plurality of user equipment 26a may send information to the first base station 24a, and one or more of the second plurality of user equipment may send information to the second base station 24b. The solid arrows represent information sent from the plurality of base stations, similar to the first and second base stations 24a and 24b, to the xRAN controller 28. The information being sent is discussed in further detail below.

In the context of MU-MIMO systems with precoding, multiple user transmissions from a plurality of user equipment may be scheduled at the same time instance and the same frequency resource, to achieve higher capacity performances. Base stations may comprise radio frequency architecture having the capability to synthetize multiple directive beams (hereinafter referred to as "beams"/"beam") in the direction of the scheduled user equipment, in order to increase the spectral efficiency. The multiple-directive beams may be issued from a pre-set Grid of Beams (GoB). A probability of interference between beams transmitted by one or more base stations may be determined based at least partially on user equipment downlink power measurements. User equipment downlink power measurements are measurements of received power of one or more beams at the user equipment.

Figure 3:
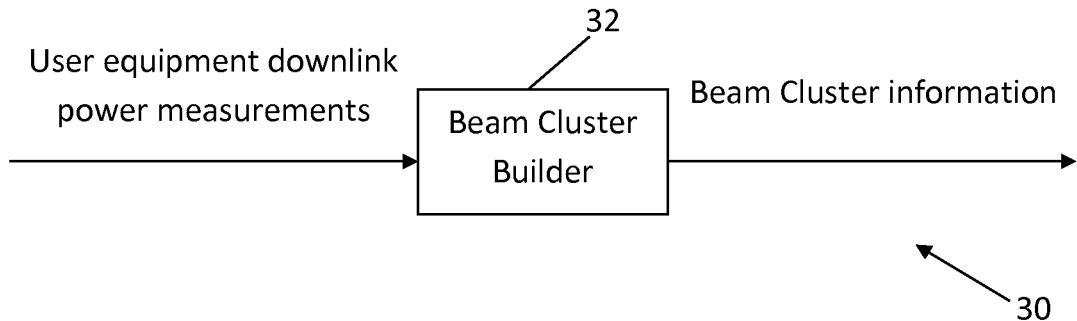
FIG. 3 is a block diagram of a system in accordance with an example embodiment.

In some example embodiments, one or more beams are assigned to one or more clusters (e.g. each beam may be assigned to a cluster). FIG. 3 is a block diagram of system, indicated generally by the reference numeral 30, in accordance with an example embodiment. System 30 comprises a beam cluster builder 32. The beam cluster builder 32 receives user equipment downlink power measurements (e.g. per beam downlink power measurements) as an input, and provides beam cluster information as an output. In one example embodiment, the beam cluster builder 32 is provided as a part of xRAN controller 28. Alternatively or additionally, the beam cluster builder 32 may be provided as a part of one or more base stations, similar to the first and second base stations 24a and 24b. The operations performed by the beam cluster builder 32 are discussed in further detail in FIG. 4 and FIG. 5.

Figure 4:
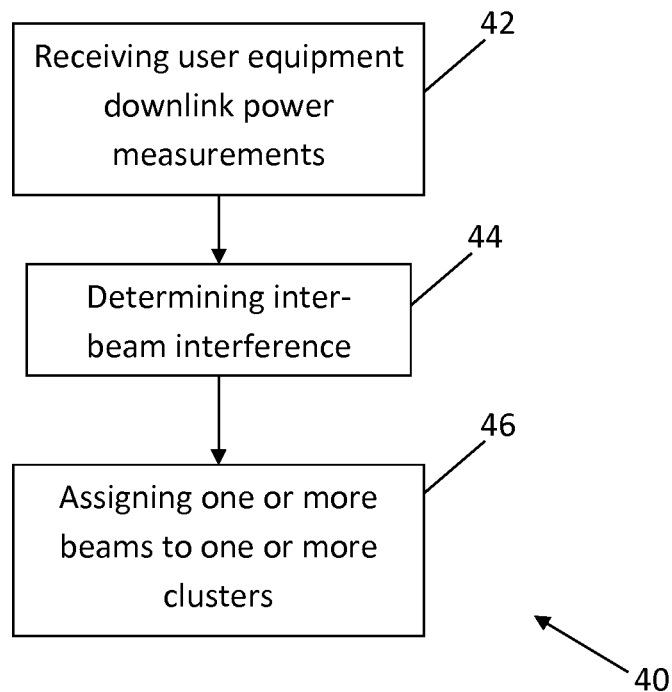
FIG. 4 is a flowchart showing an algorithm in accordance with an example embodiment.

FIG. 4 is a flowchart showing an algorithm, indicated generally by the reference numeral 40, in accordance with an example embodiment. The operations of algorithm 40 may be performed at the beam cluster builder 32. At operation 42, user equipment downlink power measurements are received. At operation 44, the inter-beam interference for beams corresponding to each of the plurality of base stations is determined based on the received user equipment downlink power measurements. At operation 46, one or more beams are assigned to one or more clusters. The assigning may be performed such that an inter-beam interference is below a threshold for all beams comprised within a cluster and all beams comprised within the cluster may share time and/or frequency resources.

For example, viewing FIG. 4 in conjunction with FIG. 2, the first base station 24a sends a first set of user equipment downlink power measurements of the first plurality of user equipment 26a to the xRAN controller 28, and the second base station 24b sends a second set of user equipment downlink power measurements of the second plurality of user equipment 26b to the xRAN controller 28. Therefore, at operation 42, the first and second sets of user equipment downlink power measurements are received. At operation 44, inter-beam interference is determined. The inter-beam interference may be calculated based on both the first set and the second set of user equipment downlink power measurements. The user equipment downlink power measurements may comprise information of downlink power received from beams transmitted by at least two base stations. As the first base station 24a and the second base station 24b are neighbouring base stations, the beams of the first and second base-stations 24a and 24b may cause interference and may affect both the first and second set of user equipment downlink power measurements. At operation 46, one or more beams of the first base station 24a are assigned to a first one or more clusters, and one or more beams of the second base station 24b are assigned to a second one or more clusters. For example, the first one or more clusters comprises a first cluster. The first cluster then includes a plurality of beams between which the inter-beam interference is below a threshold. The plurality of beams in the first cluster may be scheduled using the same time and frequency resources, such that the plurality of beams may be switched on simultaneously on the same frequency resources while the interference is minimal.

As stated earlier, the beam cluster builder 32 may be comprised in the xRAN controller 28 and/or one or more base stations. In an example where the beam cluster builder 32 is comprised in the xRAN controller 28, each base station receives the user equipment downlink power measurements from connected user equipment (dotted arrows of FIG. 2) and the xRAN controller 28 receives the user equipment downlink power measurements from a plurality of base stations (operation 42, solid arrows of FIG. 2). The beam cluster builder 32 may provide beam cluster information for a plurality of base stations. Alternatively or additionally, in an example where the beam cluster builder 32 is comprised in a base station (such as the first base station 24a), the first base station 24a receives user equipment downlink power measurements from a plurality of connected user equipment 26a, and the beam cluster builder 32 may provide beam cluster information for only the first base station 24a.

The beam cluster builder 32 may support user equipment pairing in a MU-MIMO scheduler. Any group of beams from the cluster could be co-scheduled by the relevant base station at the same scheduling instance (in a MU-MIMO pairing operation).

In an example embodiment, the user equipment downlink power measurements are received at beam cluster builder 32 via a B1 interface of the xRAN controller. Operation 42 of algorithm 42 may be performed at the B1 interface.

The beam cluster builder 32 may take advantage of spatial separation of a plurality of beams when creating clusters. The beams that are farther apart from each other may have the lowest inter-beam interference, and may therefore be assigned to the same clusters. As illustrated in FIG. 1, channels 5a and 5b are likely to cause very little inter-beam interference with each other. As such, the beams corresponding to channels 5a and 5b may be assigned to the same cluster, and may share time and/or frequency resources.

In one example, the operations of algorithm 40 may be required to be performed when channel conditions undergo changes. For example, the channel conditions may undergo changes due to a new building construction or the like.

Figure 5:
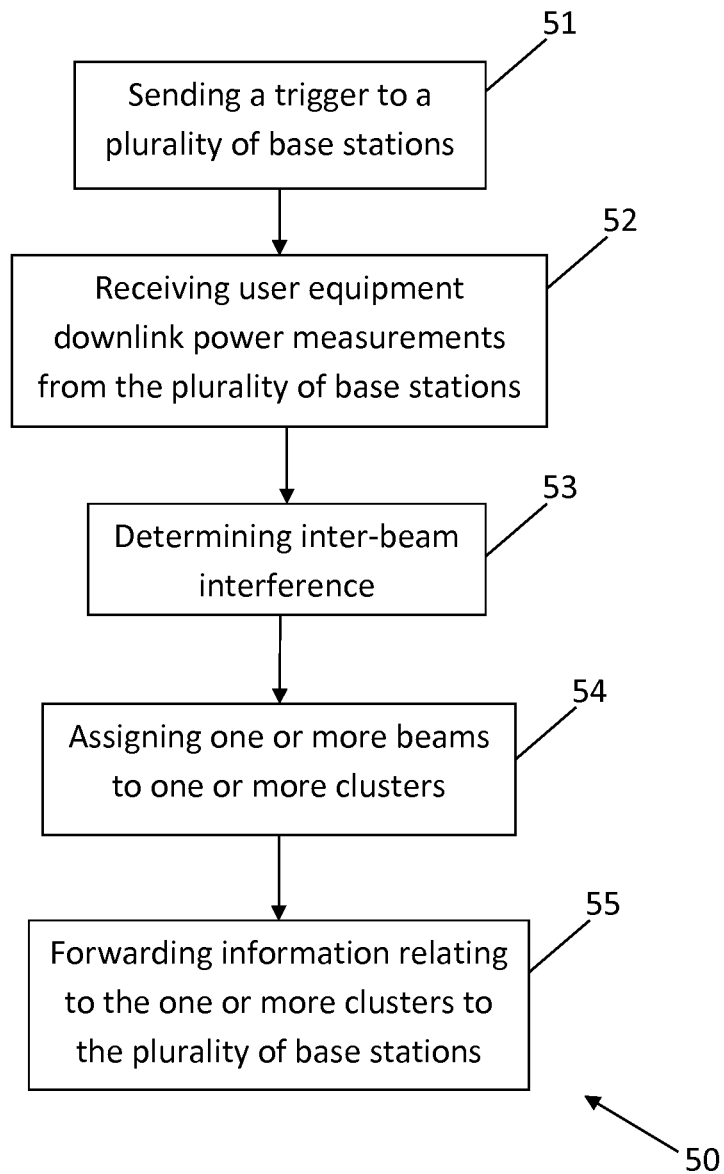
FIG. 5 is a flowchart showing an algorithm in accordance with an example embodiment.

FIG. 5 is a flowchart showing an algorithm, indicated generally by the reference numeral 50, in accordance with an example embodiment. For the example embodiment of FIG. 5, the beam cluster builder 32 is provided at the xRAN controller 28, and the operations of algorithm 50 are performed at the xRAN controller 28. At operation 51, the xRAN controller 28 sends a trigger to a plurality of base stations (similar to the first and second base stations 24a and 24b). The trigger is sent as a request for user equipment downlink power measurements corresponding to the plurality of base stations. At operation 52 (similar to operation 42), the xRAN controller 28 receives user equipment downlink power measurements from the plurality of base stations in response to the trigger. At operation 53 (similar to operation 44), the inter-beam interference is determined. At operation 54 (similar to operation 46), one or more beams are assigned to one or more clusters, and beam cluster information is generated. At operation 55, information relating to the one or more clusters (beam cluster information) is forwarded to the plurality of base stations. The plurality of base stations may use the information relating to the one or more clusters for the purposes of scheduling user equipment communications. For example, information of one or more clusters of beams for the first base station 24a is forwarded to the first base station 24a, and information of one or more clusters of beams for the second base station 24b is forwarded to the second base station 24b.

Figure 6:
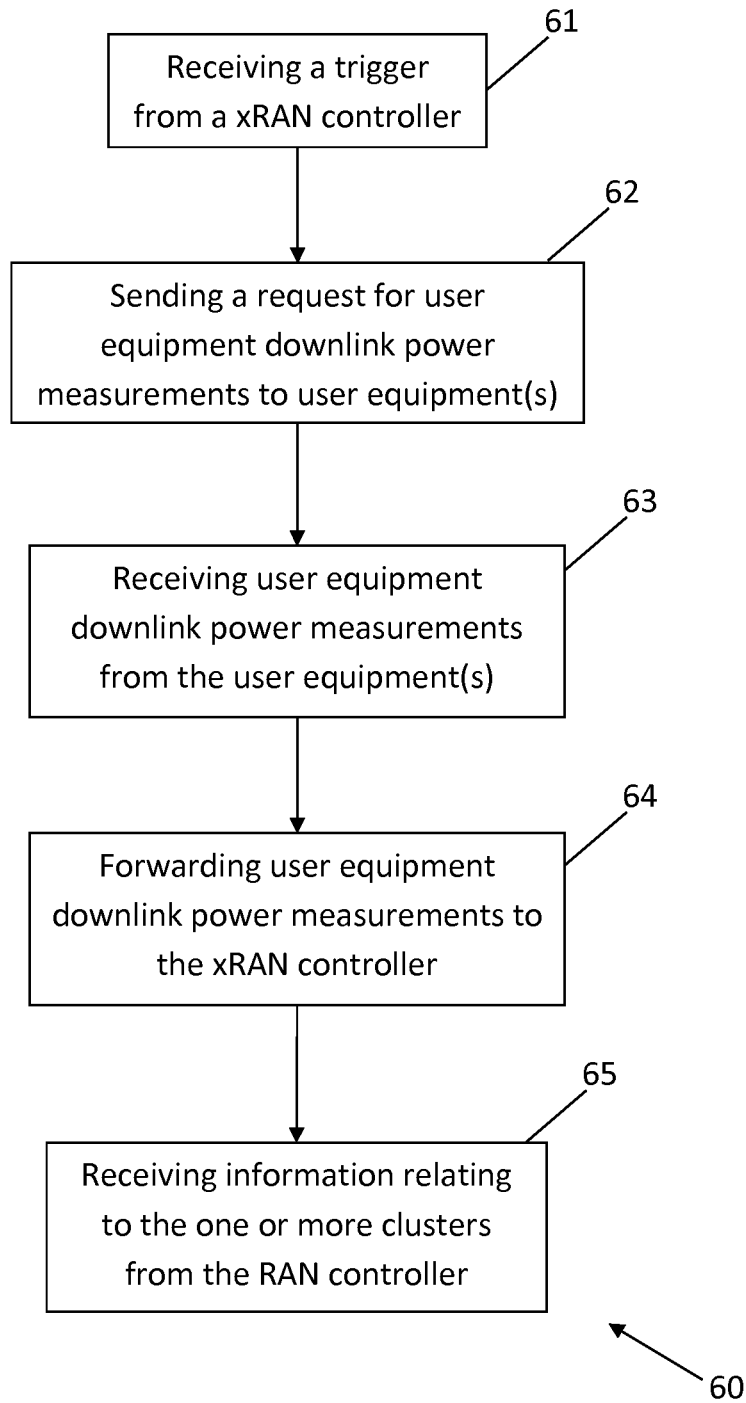
FIG. 6 is a flowchart showing an algorithm in accordance with an example embodiment.

FIG. 6 is a flowchart showing an algorithm, indicated generally by the reference numeral 60, in accordance with an example embodiment. For the example embodiment of FIG. 6, the beam cluster builder 32 is provided at the xRAN controller 28, and the operations of algorithm 60 are performed at a base station, such as the first base station 24a. The trigger may be a request for user equipment downlink power measurements. At operation 6i, the first base station 24a receives a trigger from the xRAN controller 28. At operation 62, the first base station 24a sends a request to each one of the first plurality of user equipment 26a for user equipment downlink power measurements corresponding to the respective user equipment. At operation 63, the first base station 24a receives user equipment downlink power measurements from the first plurality of user equipment 26a. At operation 64, the first base station 24a forwards the user equipment downlink power measurements received from all of the first plurality of user equipment to the xRAN controller 28. At operation 65, the first base station 24a receives information relating to the one or more clusters from the xRAN controller 28.

As stated earlier, the information relating to the one or more clusters may be obtained at the xRAN controller based on the user equipment downlink power measurements. The first base station 24a may then use the information relating to the one or more clusters for scheduling communications with the first plurality of user equipment 26a. As also stated earlier, the cluster builder and the cluster information may be available at the base station itself. In that case, clustering may help to identify the beams that can be co-scheduled at the base station side, taking into account per-base station inter beam interference.

Figure 7:
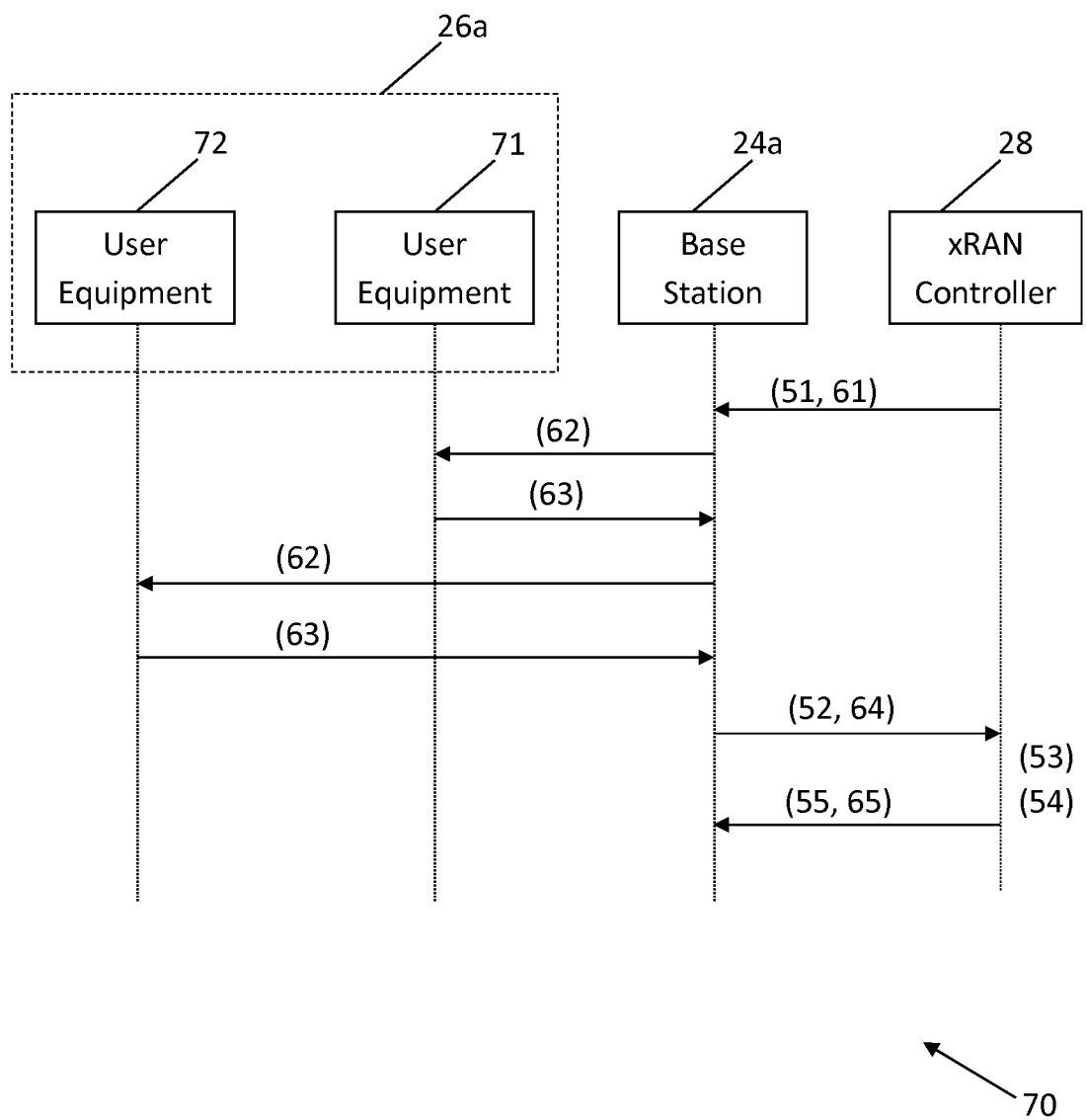
FIG. 7 is a block diagram of a system in accordance with an example embodiment.

FIG. 7 is a block diagram of a system, indicated generally by the reference numeral 70, in accordance with an example embodiment. System 70 illustrates an example of the order in which the operations of algorithms 50 and 60 may be performed. FIG. 7 includes reference numerals of the various operations of the algorithms 50 and 60.

System 70 comprises the xRAN controller 28, the first base station 24a, and the first plurality of user equipment 26a. The first plurality of user equipment 26a may comprise a first user equipment 71 and a second user equipment 72. The xRAN controller 28 sends a trigger to the first base station 24a and the first base station 24a receives the trigger at operations 51 and 61 respectively. The first base station 24a sends a request to the user equipment 71 and the user equipment 72 at operation 62. At operation 63, the first base station 24a receives: a first user equipment downlink power measurement information from the first user equipment 71 for a beam used by the first user equipment 71; and a second user equipment downlink power measurement information from the second user equipment 72 for a beam used by the second user equipment 71. The first base station 24a sends the first and second user equipment downlink power measurement information (collectively referred to as user equipment downlink power measurements), and the xRAN controller 28 receives the user equipment downlink power measurements at operations 64 and 52 respectively. The xRAN controller 28 then performs operations 53 and 54 and assigns one or more beams to one or more clusters based on inter-beam interference. After performing operations 53 and 54, the xRAN controller 28 sends and the first base station receives information relating to the one or more clusters at operations 55 and 65 respectively.

Of course, although the system 70 described above includes two example user equipments 71 and 72, the clustering operations described herein may be performed based on a wide set of reported data from many user equipments. Clustering may be based on statistics reported from data reported by multiple user equipments spread over the relevant coverage area and/or during a sufficient period of time so that power reported by the user equipments is representative of power measured over the whole covered area.

Figure 8:
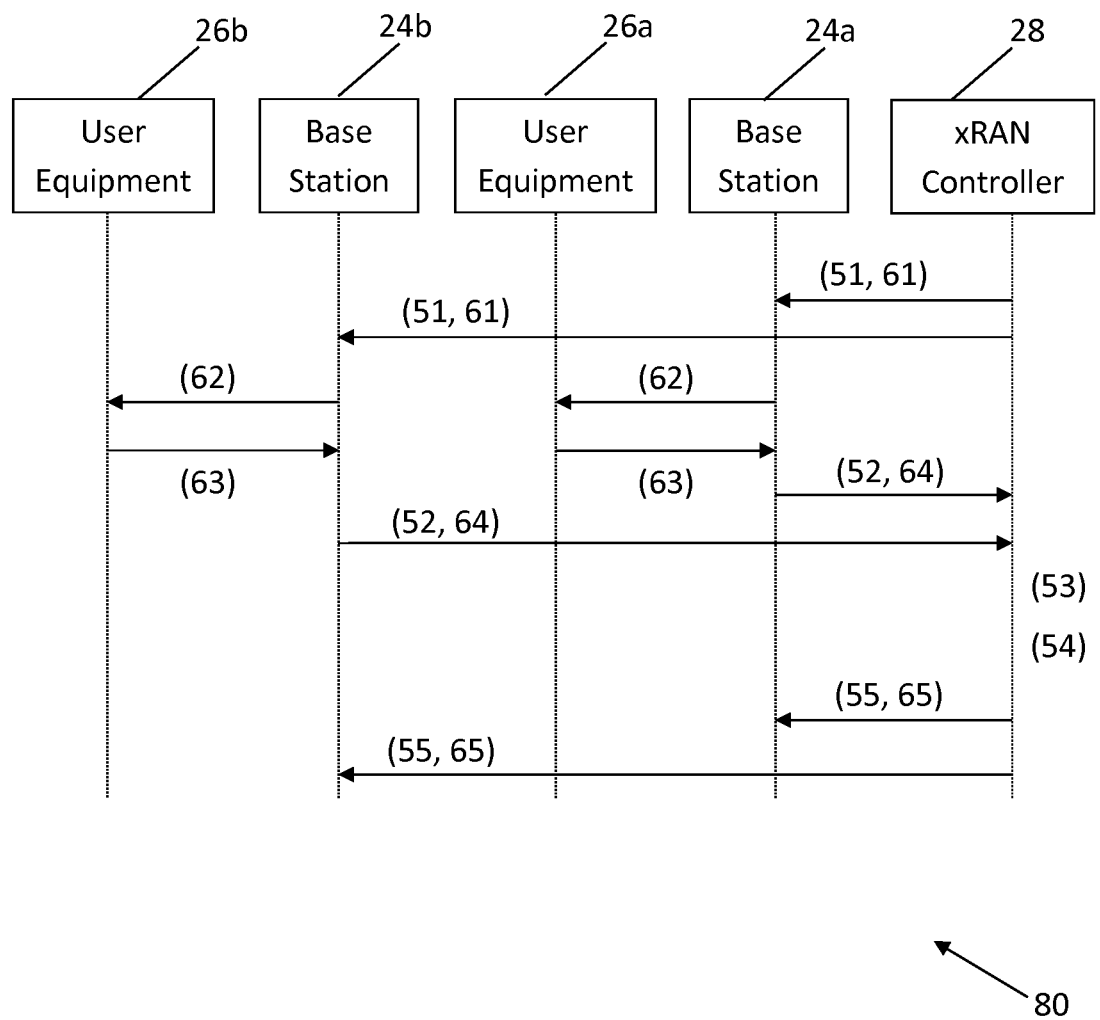
FIG. 8 is a block diagram of a system in accordance with an example embodiment.

FIG. 8 is a block diagram of a system, indicated generally by the reference numeral 80, in accordance with an example embodiment. System 80 illustrates an example of the order in which the operations of algorithms 50 and 60 may be performed. FIG. 8 includes reference numerals of the various operations of the algorithms 50 and 60.

System 80 comprises the xRAN controller 28, the first base station 24a, the first plurality of user equipment 26a, the second base station 24b, and the second plurality of user equipment 26b. The xRAN controller 28 sends a trigger to each of the first base station 24a and the second base station 24b, and each of the first base station 24a and the second base station 24b receives the trigger at operations 51 and 61 respectively. The first base station 24a sends a first request to each of the first plurality of user equipment 26a and the second base station 24b sends a second request to each of the second plurality of user equipment 26b at operation 62. At operation 63, the first base station 24a receives a first set of user equipment downlink power measurements from the first plurality of user equipment 26a for beams used by one or more of the first plurality of user equipment 26a, and the second base station 24b receives a second set of user equipment downlink power measurements from the second plurality of user equipment 26b for beams used by one or more of the second plurality of user equipment 26b. At operation 64, the first base station 24a sends the first set of user equipment downlink power measurements and the second base station 24b sends the second set of user equipment downlink power measurements to the xRAN controller 28, which receives the first and second set of user equipment downlink power measurements (collectively referred to as user equipment downlink power measurements) at operation 52. The xRAN controller 28 then performs operations 53 and 54 and assigns one or more beams to one or more clusters based on inter-beam interference based at least partially on the first and second set of user equipment downlink power measurements. After performing operations 53 and 54, at operation 55, the xRAN controller 28 sends information relating to the one or more clusters corresponding to the first base station 24a to the first base station 24a, and sends information relating to the one or more clusters corresponding to the second base station 24b to the second base station 24b. The first and second base stations 24a and 24b receive the information relating to the one or more clusters at operation 65.

In an example embodiment, for the purposes of assigning one or more beams to one or more clusters, a similarity between the beams is evaluated. A similarity between two beams may be inversely proportional to an inter-beam interference between the two beams. The similarity may be evaluated at least partially based on a distance between beams and/or from a statistical analysis of the user equipment measurements. For example, the more the distance between the beams is, the higher the similarity. The statistical analysis may be performed by calculating the probability that inter-beam interference is higher than a threshold.

For example, when the inter-beam interference between two beams is low, the similarity is evaluated to be high. The two beams are then assigned to the same cluster as the similarity is high. As such, in order to assign the plurality of beams of a base station to one or more clusters, inter-beam interference and similarity is calculated for all possible pairs of beams of the base station and, for example, of a neighbouring base station (such as beams of the first base station 24a and beams of the second base station 24b). The beams are then assigned to one or more clusters based on the similarity. Of course, although in some embodiments the beams of neighbouring base stations are relevant, the principles described herewith are relevant to embodiments considering only beams of a single base station.

In an example, each user equipment (UE) is mapped to a beam from which it receives highest power. The set of user equipment that are mapped to the same beam $B_x$ may be denoted by $\{UE_{x,1}, \ldots, UE_{x,\Delta(x)}\}$, where $\Delta(x)$ is the number of UEs that are served by the beam $B_x$.

The following equations may be used for determining similarity between beams: $B_x$ and $B_y$. Beams $B_x$ and $B_y$ may be considered to have high similarity if the probability (prob($I_{y \to x}$>Th)) that UE of $B_x$ receives interference higher than a threshold from UE of $B_y$, and the probability (prob ($I_{x \to y}$>Th)) that UE of $B_y$ receives interference higher than a threshold from UE of $B_x$ are both low. The similarity $S(B_x,B_y)$ can be evaluated as follows:

$$S(B_x,B_y)=e^{\hat{}}(-\beta \text{ prob}(I_{x \to y}>Th)).e^{\hat{}}(-\beta \text{ prob}(I_{y \to x}>Th))$$

where $I_{y \to x}$ captures the interference from $B_y$ transmissions, experienced by a UE served by $B_x$, and where $I_{x \to y}$ captures the interference from $B_x$ transmissions, experienced by a UE served by $B_y$.

In an example embodiment, the one or more beams are assigned to one or more clusters at operations 46 and 54 using spectral clustering. Spectral clustering may use an affinity matrix as an input. The affinity matrix may directly be deduced from the evaluated similarity between beams. Spectral clustering may be based on a graph partitioning, and is performed by building a similarity graph. Data points of the similarity graph may be similarity data $S(B_x,B_y)$ for each pair of beams.

Figure 9:
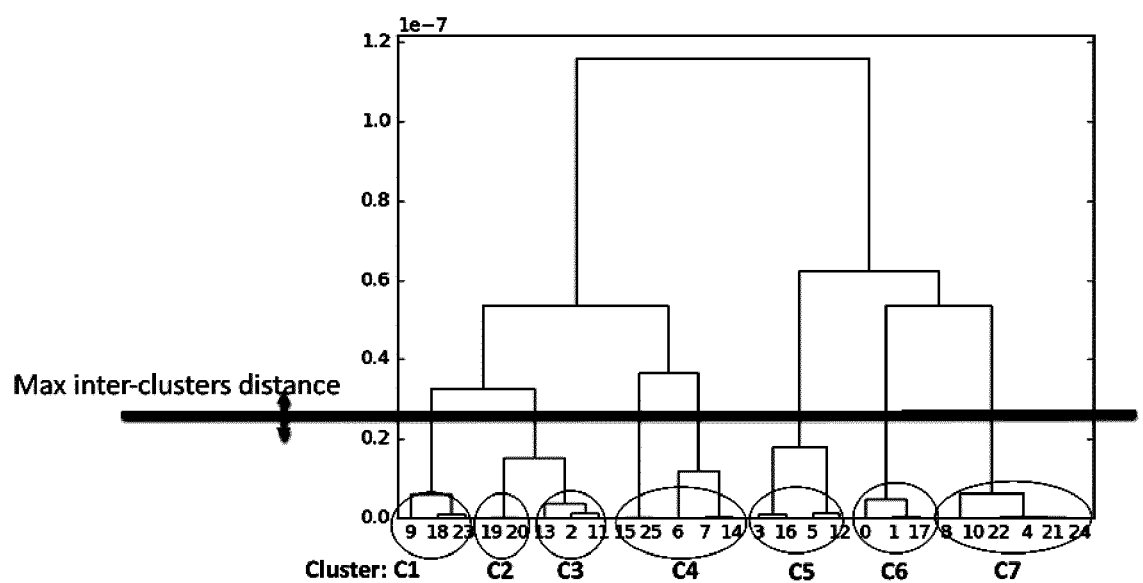
FIG. 9 is a graphical representation of hierarchical clustering.

In an example embodiment, the one or more beams are assigned to one or more clusters at operations 46 and 54 using hierarchical agglomerative clustering. Hierarchical agglomerative clustering may be performed by iteratively merging clusters (and is therefore distinguished from hierarchical divisive clustering), according to similarity. For example, at a first iteration, each beam is assigned to a different cluster. The similarity between each pair of clusters is then evaluated. Closest pairs of clusters are then merged. Different options for the similarity between clusters can be considered. The process may be iterated until a stop criterion, for example, when a minimum similarity between clusters is reached. FIG. 9 is a graphical representation of hierarchical clustering.

Figure 10:
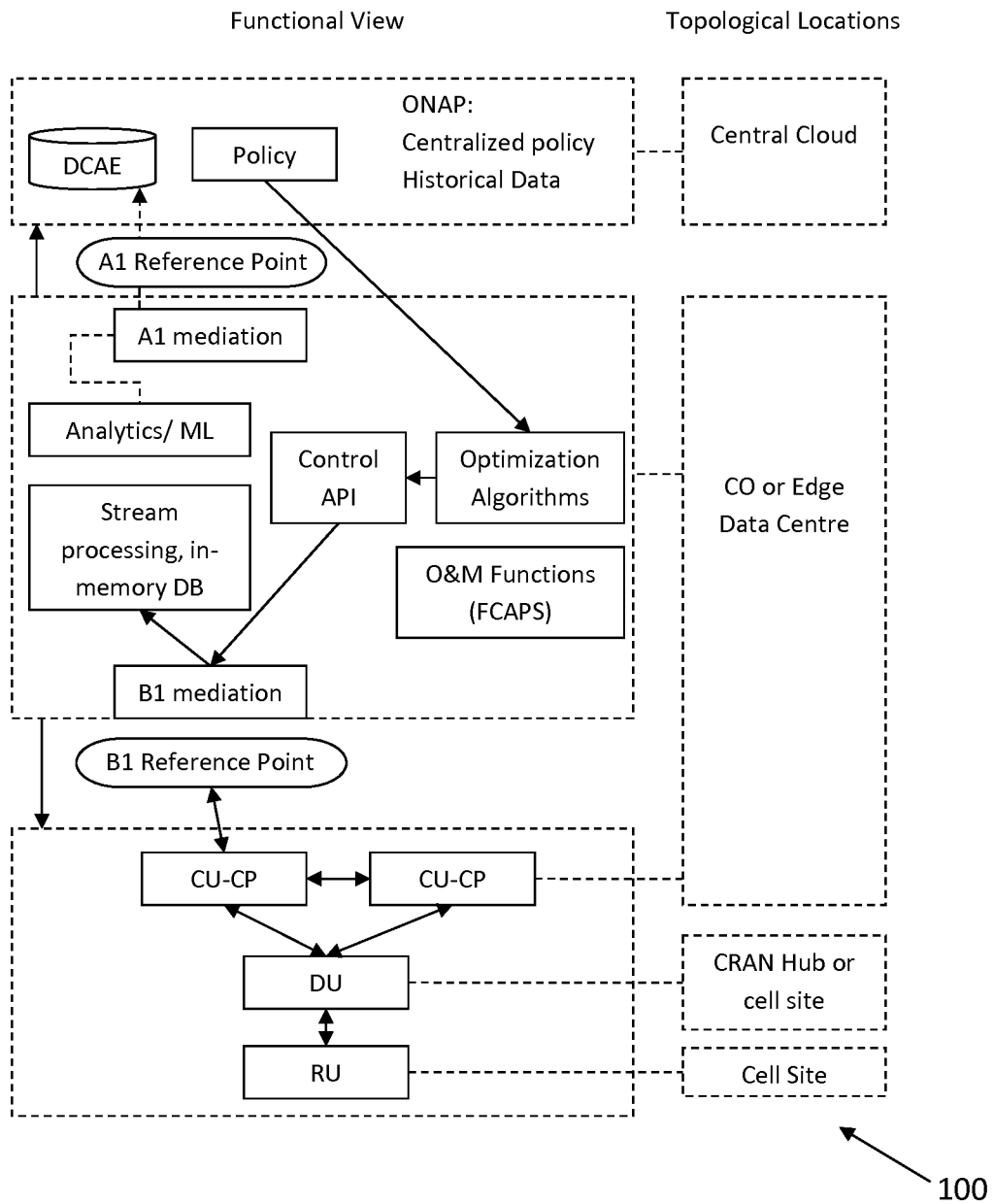
FIG. 10 is a block diagram of a system in accordance with an example embodiment.

FIG. 10 shows a system, indicated generally by the reference numeral 100, in accordance with an example embodiment. System 100 shows architecture of an extensible radio access network (xRAN), which includes an x RAN controller similar to the xRAN controller 28. The xRAN comprises, in a first module, an Open Networking Automation Platform, which may be a central cloud storing centralized policies and historical data (in the data collection, analytics, and events (DCAE) subsystem). The xRAN further comprises, in a second module, a commitment ordering (CO) or edge data centre, which comprises an A1 mediation module, an analytics and/or machine learning module, a stream processing and/or in-memory database module, a control application programming interface module, an operations and maintenance functions module (fault, configuration, accounting, performance and security (FCAPS)), optimization algorithms module, and a B1 mediation module. The xRAN network further comprises, in a third module, a central unit-control plane module, a central unit-user plane module, a distributed unit (in a centralized RAN hub or a cell cite), and a radio unit (in a cell site).

Viewing FIG. 10 in conjunction with FIG. 5, the trigger may be sent to a plurality of base stations at operation 51 via the B1 reference point (or B1 interface), and user equipment downlink power measurements may be received at operation 52 via the B1 reference point (or B1 interface). The one or more beams may be assigned to one or more clusters at operation 42 using the optimization algorithms. The information relating to the one or more clusters may be forwarded to the plurality of base stations at operation 55 via the B1 reference point (or B1 interface) from the second module to the third module.

Figure 11:
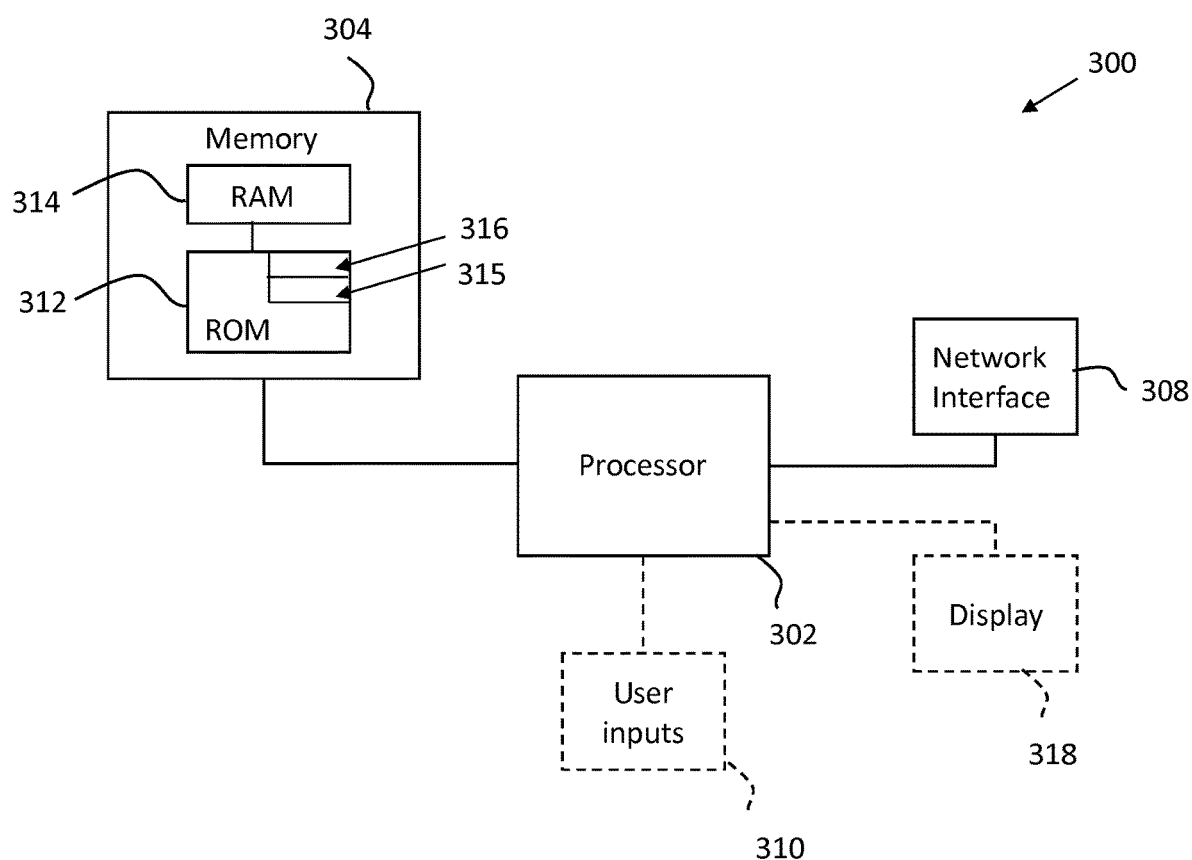
FIG. 11 is a block diagram of a system in accordance with an example embodiment.

For completeness, FIG. 11 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40, 50, or 60 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 12A:
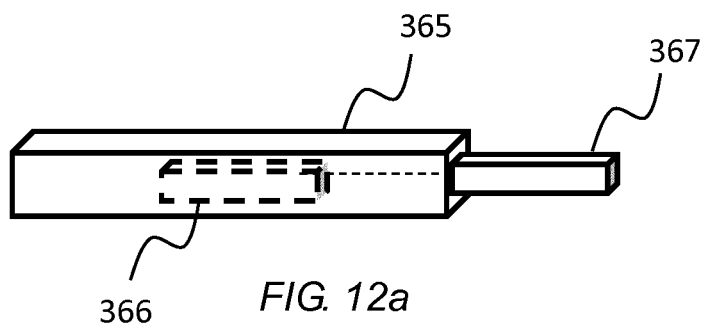
FIGS. 12A and 12B show tangible media, respectively a removable memory unit and a compact disc (CD) storing computer-readable code which when run by a computer perform operations according to example embodiments.
Figure 12B:
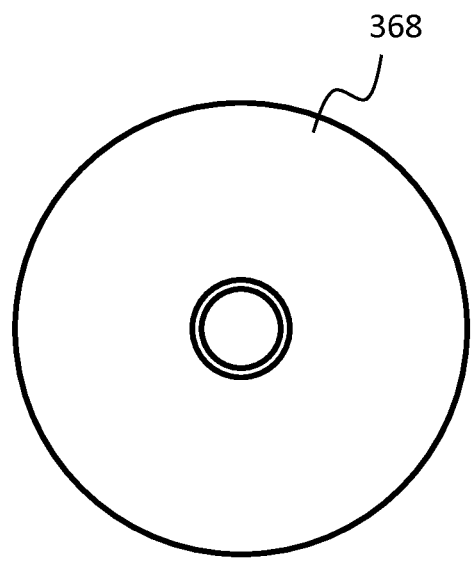

FIGS. 12*a* and 12*b* show tangible media, respectively a removable non-volatile memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4, 5, and 6 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one memory storing computer program code; and
at least one processor configured to execute the computer program code and cause the apparatus to,
receive user equipment downlink power measurements from one or more base stations of a communication system, wherein the one or more base stations are configured to provide a plurality of user equipment downlink power measurements for user equipment in communication with a respective base station of the one or more base stations,
determine inter-beam interference for multiple directive beams of the one or more base stations based on the user equipment downlink power measurements; and
assign one or more beams to one or more clusters such that, for all beams within a cluster, inter-beam interference based on the user equipment downlink power measurements being below a threshold, wherein beams within a cluster share at least one of time or frequency resources.

2. The apparatus as claimed in claim 1, wherein the apparatus is further configured to forward information relating to said one or more clusters to the one or more base stations for use in scheduling user equipment communications.

3. The apparatus as claimed in claim 1, wherein the apparatus is further configured to
transmit a trigger to the one or more base stations,
wherein the one or more base stations are configured to obtain the user equipment downlink power measurements in response to the trigger.

4. The apparatus as claimed in claim 1, wherein the apparatus is further configured to provide the determining at least one of inter-beam interference or the assigning said one or more beams to said one or more clusters as part of a radio access network controller.

5. The apparatus as claimed in claim 1, wherein the apparatus is further configured to provide the determining at least one of inter-beam interference or the assigning said one or more beams to said one or more clusters as part of one or more of the base stations.

6. The apparatus as claimed in claim 1, wherein the apparatus is further configured to assign the one or more beams to one or more clusters using spectral clustering.

7. The apparatus as claimed in claim 1, wherein the apparatus is further configured to assign the one or more beams are to one or more clusters using hierarchical clustering.

8. The apparatus as claimed in claim 1, wherein the apparatus is further configured to evaluate similarity between beams based on the user equipment downlink power measurements, and
assign said one or more beams to said one or more clusters based on the similarity.

9. The apparatus as claimed in claim 8, wherein the similarity is inversely proportional to inter-beam interference.

10. The apparatus as claimed in claim 8, wherein the apparatus is further configured to evaluate the similarity is at least partially based on at least one of a distance between beams or from a statistical analysis of the user equipment downlink power measurements.

11. The apparatus as claimed in claim 1, wherein the user equipment downlink power measurements comprise information of downlink power received from beams transmitted by at least two base stations.

12. The apparatus as claimed in claim 1, wherein the communication system is a multi-user multiple-input-multiple-output communication system.

13. A method comprising:
receiving user equipment downlink power measurements from one or more base stations of a communication system, wherein the one or more base stations are configured to provide a plurality of user equipment downlink power measurements for user equipment in communication with a respective base station of the one or more base stations;
determining inter-beam interference for multiple directive beams of the one or more base stations based on the user equipment download power measurements; and
assigning one or more beams to one or more clusters such that, for all beams within a cluster, inter-beam interference based on the user equipment downlink power measurements being below a threshold, wherein beams within a cluster share at least one of time or frequency resources.

14. A non-transitory computer-readable storage medium storing computer-readable instructions that, when executed, cause one or more processors to cause an apparatus to perform a method comprising:
receiving user equipment downlink power measurements from one or more base stations of a communication system, wherein the one or more base stations are configured to provide a plurality of user equipment downlink power measurements for user equipment in communication with a respective base station of the one or more base stations;
determining inter-beam interference for multiple directive beams of the one or more base stations based on the user equipment download power measurements; and
assigning one or more beams to one or more clusters such that, for all beams within a cluster, inter-beam interference based on the user equipment downlink power measurements being below a threshold, wherein beams within a cluster share at least one of time or frequency resources.

15. The apparatus as claimed in claim 1, wherein the one or more clusters are for scheduling user equipment communications.

* * * * *